US009088969B2

(12) United States Patent
Park

(10) Patent No.: US 9,088,969 B2
(45) Date of Patent: Jul. 21, 2015

(54) SHORT RANGE WIRELESS COMMUNICATION APPARATUS AND METHOD

(75) Inventor: Min Ki Park, Hwaseong-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 155 days.

(21) Appl. No.: 13/347,942

(22) Filed: Jan. 11, 2012

(65) Prior Publication Data

US 2012/0225643 A1 Sep. 6, 2012

(30) Foreign Application Priority Data

Mar. 3, 2011 (KR) ........................ 10-2011-0019056

(51) Int. Cl.
*H04M 3/42* (2006.01)
*H04W 76/02* (2009.01)
*H04M 1/725* (2006.01)
*H04M 1/2745* (2006.01)
*H04W 8/26* (2009.01)
*H04W 84/18* (2009.01)

(52) U.S. Cl.
CPC .......... *H04W 76/023* (2013.01); *H04M 1/7253* (2013.01); *H04M 1/2745* (2013.01); *H04M 2250/02* (2013.01); *H04W 8/26* (2013.01); *H04W 84/18* (2013.01)

(58) Field of Classification Search
USPC ....................................... 455/414.1
See application file for complete search history.

(56) References Cited

U.S. PATENT DOCUMENTS

| 2006/0246884 | A1* | 11/2006 | Ansari ........................ 455/419 |
| 2007/0293193 | A1* | 12/2007 | Ramsten et al. ............. 455/411 |
| 2008/0287060 | A1* | 11/2008 | Ramsten et al. ............. 455/41.1 |
| 2010/0041334 | A1* | 2/2010 | Engelsma et al. ........... 455/41.2 |
| 2010/0255778 | A1* | 10/2010 | Lovell et al. ................ 455/41.2 |

* cited by examiner

*Primary Examiner* — Mazda Sabouri
(74) *Attorney, Agent, or Firm* — Jefferson IP Law, LLP

(57) ABSTRACT

A method and apparatus for establishing a connection to a short range wireless communication device using identity information such as contact address is provided. The method includes collecting, when a connection request is made to a device corresponding to contact information stored in the short range wireless communication device, device information of short range wireless communication devices discovered nearby, and establishing a connection to the short range wireless communication device represented by the device information matching with the contact information in part among the collected device information. The short range wireless communication apparatus and method of the present invention facilitate connection to a target device even when a large number of devices are discovered nearby.

14 Claims, 9 Drawing Sheets

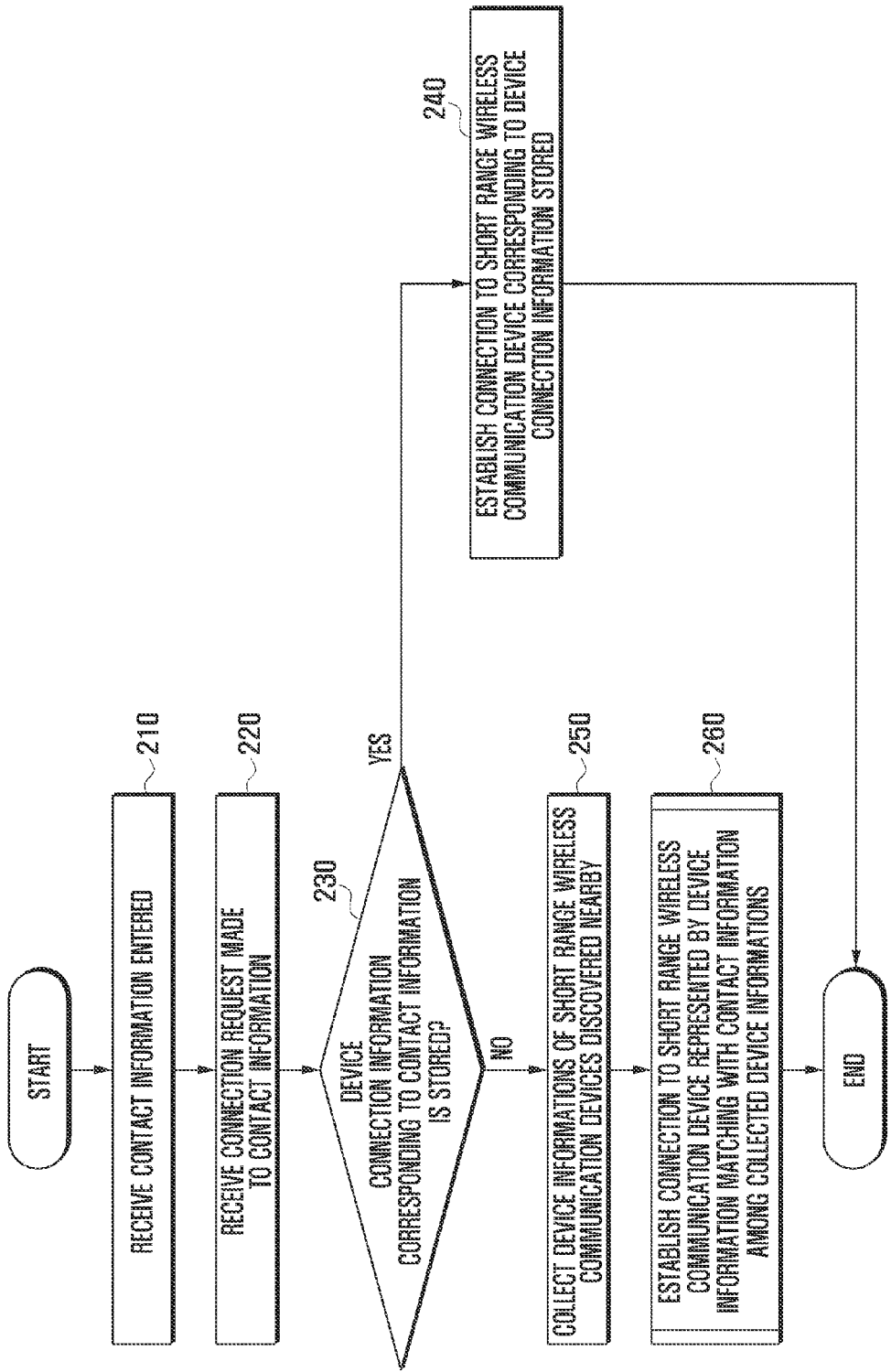

SHORT RANGE WIRELESS COMMUNICATION APPARATUS AND METHOD

PRIORITY

This application claims the benefit under 35 U.S.C. §119 (a) of a Korean patent application filed on Mar. 3, 2011 in the Korean Intellectual Property Office and assigned Serial No. 10-2011-0019056, the entire disclosure of which is hereby incorporated by reference.

BACKGROUND OF THE INVENTION

1. Field of the Invention

The present invention relates to a short range wireless communication apparatus and method. More particularly, the present invention relates to a method and apparatus for establishing a connection to a short range wireless communication device using identity information such as contact address.

2. Description of the Related Art

Short range wireless communication is a wireless communication technology which enables exchange of data between devices over relatively short distance. Until recently, short range communication was implemented through wires interconnecting devices. Recently, short range wireless communication technologies are widely used to offer many advantages such as mobility and easy installation and expansion.

Short range wireless communication technologies include Bluetooth, Near Field Communication (NFC), ZigBee, and Wireless Local Area Network (WLAN). Recently, the short range wireless communication technologies are widely used for data communication.

Bluetooth technology is used for data communication and remote control via Bluetooth connection with Bluetooth-enabled devices such as earphone and headset. In order to activate a Bluetooth function of a Bluetooth-enable terminal, the terminal user executes the Bluetooth function. Once the Bluetooth function is activated, the terminal presents a list of discovered Bluetooth devices so that the terminal user can select an available Bluetooth device. The terminal establishes a connection to the selected Bluetooth device for Bluetooth communication. This method is satisfactory in an environment having relatively few Bluetooth devices. However, as Bluetooth is becoming a widely adopted technology, the number of Bluetooth devices discovered nearby is increasing and, as a consequence, device identification issues are arising. Assuming that a few dozens of Bluetooth devices are presented in the device list, it becomes difficult for the user to select the target device from the device list.

Although the description is directed to the Bluetooth technology, similar issues may occur in other short range wireless communication technologies.

SUMMARY OF THE INVENTION

Aspects of the present invention are to address at least the above-mentioned problems and/or disadvantages and to provide at least the advantages described below. Accordingly, an aspect of the present invention is to provide a short range wireless communication apparatus and method that is capable of facilitating connection to a target device even when a large number of devices are discovered nearby.

In accordance with an aspect of the present invention, a method for establishing a connection to a short range wireless communication device is provided. The method includes collecting, when a connection request is made to a device corresponding to contact information stored in the short range wireless communication device, device information of short range wireless communication devices discovered within a short range wireless communication range of the short range wireless communication device, and establishing a connection to the short range wireless communication device represented by the device information matching with the contact information in part among the collected device information.

In accordance with another aspect of the present invention, a short range wireless communication apparatus is provided. The method includes an input unit for receiving contact information and a connection request made to the contact information, a device information collector for collecting, when the connection request is input, device information of short range wireless communication devices discovered within a short range wireless communication range of the short range wireless communication device, and a short range communication unit for establishing a connection to the short range wireless communication represented by the device information matching with the contact information in part among the collected device information.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIG. 2 is a flowchart illustrating a channel establishment method of a short range wireless communication apparatus according to an exemplary embodiment of the present invention;

Throughout the drawings, it should be noted that like reference numbers are used to depict the same or similar elements, features, and structures.

DETAILED DESCRIPTION OF EXEMPLARY EMBODIMENTS

Figure 1:
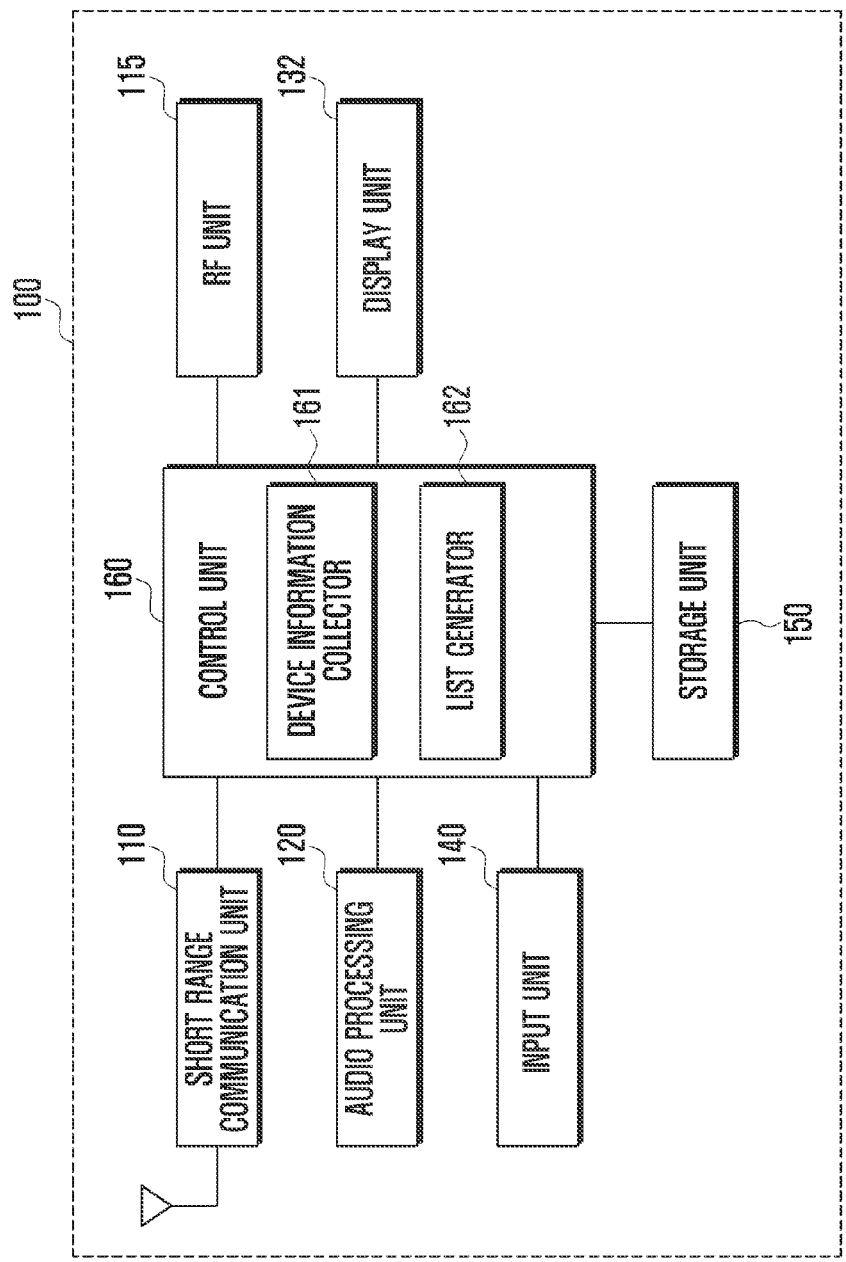
FIG. 1 is a block diagram illustrating a configuration of the short range wireless communication apparatus according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces. In the same manner, some elements are exaggerated, omitted, or just outlined in brief, and may be not drawn to scale in the accompanying drawings. Also, the size of each element may not reflect the true size. The same reference numbers are used throughout the drawings to refer to the same or like parts.

The above and other objects, features, and advantages of the present invention will be more apparent from the following detailed description in conjunction with the accompanying drawings. The invention is not limited by the embodiments shown in the drawings and described in the specification, which are given by way of example and not of limitation, but it is obvious to those skilled in the art that the embodiments may vary within the scope of the appended claims.

Descriptions are made of the short range wireless communication apparatus and connection method thereof according to exemplary embodiments of the present invention.

FIG. 1 is a block diagram illustrating a configuration of the short range wireless communication apparatus according to an exemplary embodiment of the present invention.

Referring to FIG. 1, the short range wireless communication apparatus 100 includes a short range communication unit 110, an audio processing unit 120, a display unit 132, an input unit 140, a storage unit 150, a Radio Frequency (RF) unit 115, and a control unit 160. The short wave wireless communication apparatus may include additional units. Similarly, the functionality of two or more of the above units may be integrated into a single component.

The short range communication unit 110 is responsible for short range wireless communication of data. For example, the short range communication unit is implemented with at least one of Bluetooth, Near Field Communication (NFC), ZigBee, RuBee, and Wireless Local Area Network (WLAN) functions. The short range communication unit 110 also outputs the data received over a short range wireless communication channel to the control unit 160 and transmits data output by the control unit 160 through the short range wireless communication channel. In the following, the description is made under the assumption that the short range wireless communication unit 110 is a Bluetooth module. Although the description is directed to the case where the short range wireless communication is implemented with the Bluetooth technology, the present invention is not limited thereto but can be applied to other type of short range wireless communication system. The short range communication unit 110 may establish a connection to a short range wireless communication device indicated in the device information selected by user input.

The RF unit 115 is responsible for radio communication of the short range wireless communication apparatus 100. Radio communication denotes cellular communication served by a base station. The RF unit 115 may support at least one cellular communication technology, including Long Term Evolution (LTE), Code Division Multiple Access (CDMA), Global System for Mobile communications (GSM), etc. The RF unit 115 may include an RF transmitter for up-converting and amplifying the transmission signals and an RF receiver for low noise amplifying and down-converting the received signals. The RF unit 1150 outputs the data received over a radio channel to the control unit 160 and transmits the data output by the control unit 160 over the radio channel.

The audio processing unit 120 includes a codec pack having a data codec for processing packet data and an audio codec for processing audio signal including voice. The audio processing unit 120 converts a digital audio signal to an analog audio signal via the audio codec so as to output the converted analog audio signal through a speaker and converts the analog audio signal input through a microphone to a digital audio signal via the audio codec.

The display unit 132 may be implemented with one of a Liquid Crystal Display (LCD), Organic Light Emitting Diodes (OLED), and Active Matrix OLED (AMOLED). The display unit 132 presents information to the user, including menus of the short range wireless communication apparatus 100, user input data, function settings, and the like. The display unit 132 outputs the booting screen, standby mode screen, menu screen, call progressing screen, and various application execution screens of the short range wireless communication apparatus 100. The display unit 132 may display a device list provided by a list generator 162.

The input unit 140 receives user input. The input unit 140 receives a call request made in association of specific contact information and selection input made to one of devices displayed by the display unit 132 in the form of a list. The input unit 140 may be implemented with at least one of a touchscreen and a keypad.

The touchscreen incorporates a touch sensor and the display unit 132. The touch sensor detects a touch made by the user on the screen. The touch sensor may be one of capacitive overlay, resistive overlay, and infrared beam types, or a pressure sensor. The touch sensor can be any type of sensing devices that can detect a contact or a pressure made by an object. The touch sensor detects the touch made by the user and generates a detection signal to the control unit 160. The detection signal includes coordinates of a position at which the touch is made. In case that the user makes a movement gesture on the screen without releasing the touch, the touch sensor generates the detection signal including the coordinates on the movement path to the control unit 160.

Although the description is directed to the short range wireless communication apparatus 100 equipped with a touchscreen, exemplary embodiments of the present invention are not limited thereto. In the following description, the key input unit may be replaced by a touch sensor of the touchscreen.

The key input unit receives a key input made by the user for controlling the short range wireless communication apparatus 100 and transfers the corresponding input signal to the control unit 160. The key input unit may be implemented with a keypad having numeric keys and navigation keys and certain function keys provided on a side of the short range wireless communication apparatus 100. For mobile terminals that can be fully manipulated via a touchscreen, the key input unit may be omitted or may be provided with a reduced number of buttons.

The storage unit 150 stores the programs and data necessary for operating the short range wireless communication apparatus 100 and can be divided into a program region and a data region. The program region stores the Operating System (OS) for booting up the short range wireless communication apparatus, programs for controlling the operations of the short range wireless communication apparatus 100, application programs necessary for playing multimedia contents, and other application programs for supporting optional functions such as camera function, sound playback function, still and motion picture playback function. The data region stores data generated while the short range wireless communication apparatus 100 is operating, such as pictures, video, phonebook, and audio data.

The storage unit 150 may store contact information and the short range wireless communication apparatus connection information corresponding to contact information. The short range wireless communication connection information is the device information of the short range wireless includes communication apparatus corresponding to the contact information. The device information includes a device identifier and a device name that can be obtained in the short range wireless communication signal generated by the short range wireless communication apparatus. For example, the short range wireless communication apparatus may be a Bluetooth device, and the device information of the Bluetooth device may include at least one of a Bluetooth address and Bluetooth name.

The control unit 160 controls the operations of the internal function blocks of the short range wireless communication apparatus 100. The control unit 160 includes a device information collector 161 and a list generator 162.

When a connection request input made to a specific contact information item is detected by the input unit 140, the device information collector 161 collects the device information of short range wireless communication devices existing nearby. The device information includes the information such as device identifier and device name that can be acquired in the short range wireless communication signal transmitted by the short range wireless communication devices. For example, if the short range wireless communication apparatus is a Bluetooth device, the device information of the Bluetooth device may include at least one of Bluetooth address and Bluetooth device name. When the short range wireless communication apparatus connection information corresponding to the contact information is stored in the storage unit 150, the device information collector 161 establishes a connection to the short range wireless communication apparatus corresponding to the short range wireless communication information without collecting the device information. When there is no short range wireless communication apparatus connection information corresponding to the contact information in the storage, the device information collector 161 collects the device information of the short range wireless communication devices discovered nearby. The short range wireless communication information is the device information of the short range wireless communication device corresponding to the contact information.

The list generator 162 generates a list of the device information which is at least partially identical with the contact information. How to generate the device list is described below with respect to FIG. 2. The operations of the function blocks of the short range wireless communication apparatus is described below with respect to FIG. 2.

FIG. 2 is a flowchart illustrating a channel establishment method of a short range wireless communication apparatus according to an exemplary embodiment of the present invention.

Referring to FIG. 2, the input unit 140 receives contact information input by the user in step 210. For example, the contact information can be the phone number and/or contact name input by key manipulation. The user can input the contact information by selecting one of contact items from a phonebook. The input unit 140 receives a call request command to the contact information in step 220. The call request command is input by selecting a specific button or by making a specific touch gesture on the screen for instructing to make a call to the short range wireless device represented by the contact information. The contact information can include property information of the contact such as phone number, contact name, Internet Protocol (IP) address, and email address.

Figure 3A:
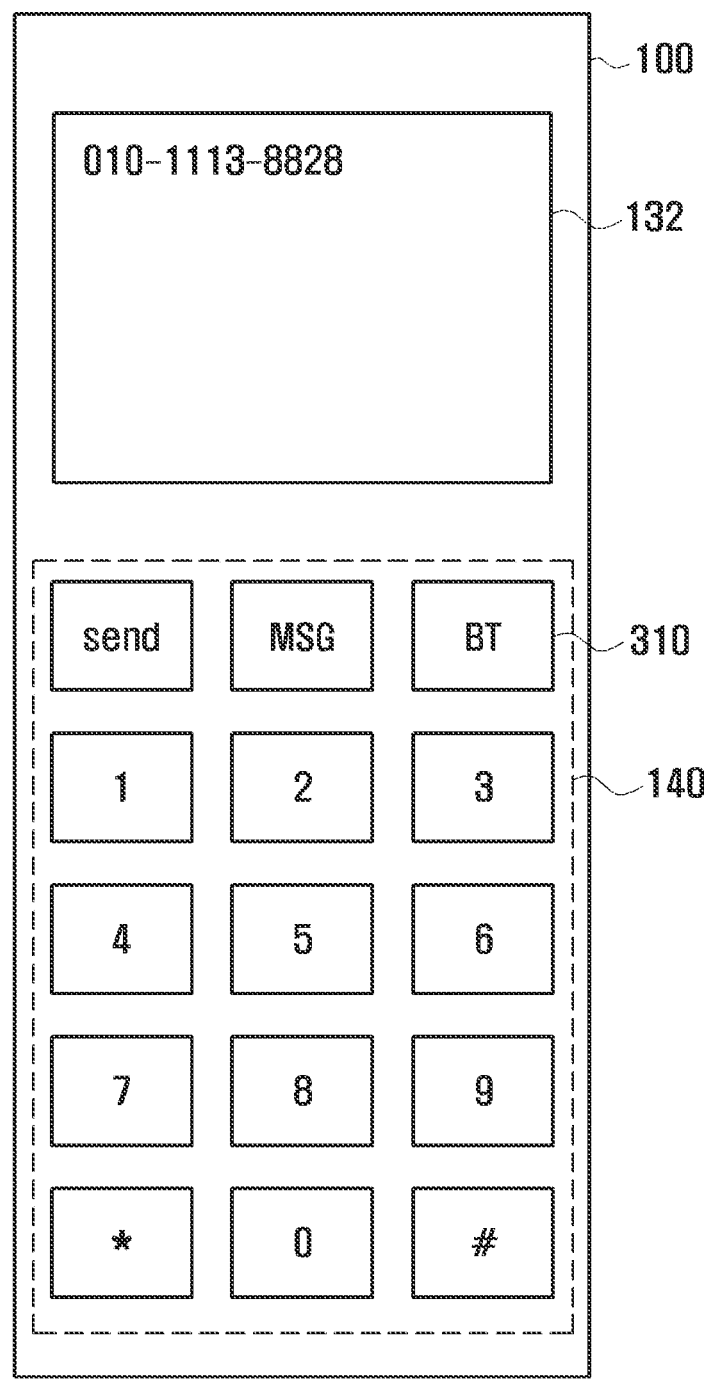
FIGS. 3A and 3B are diagrams illustrating exemplary states of the short range wireless communication apparatus with the inputs of contact information and call request command according to an exemplary embodiment of the present invention.
Figure 3B:
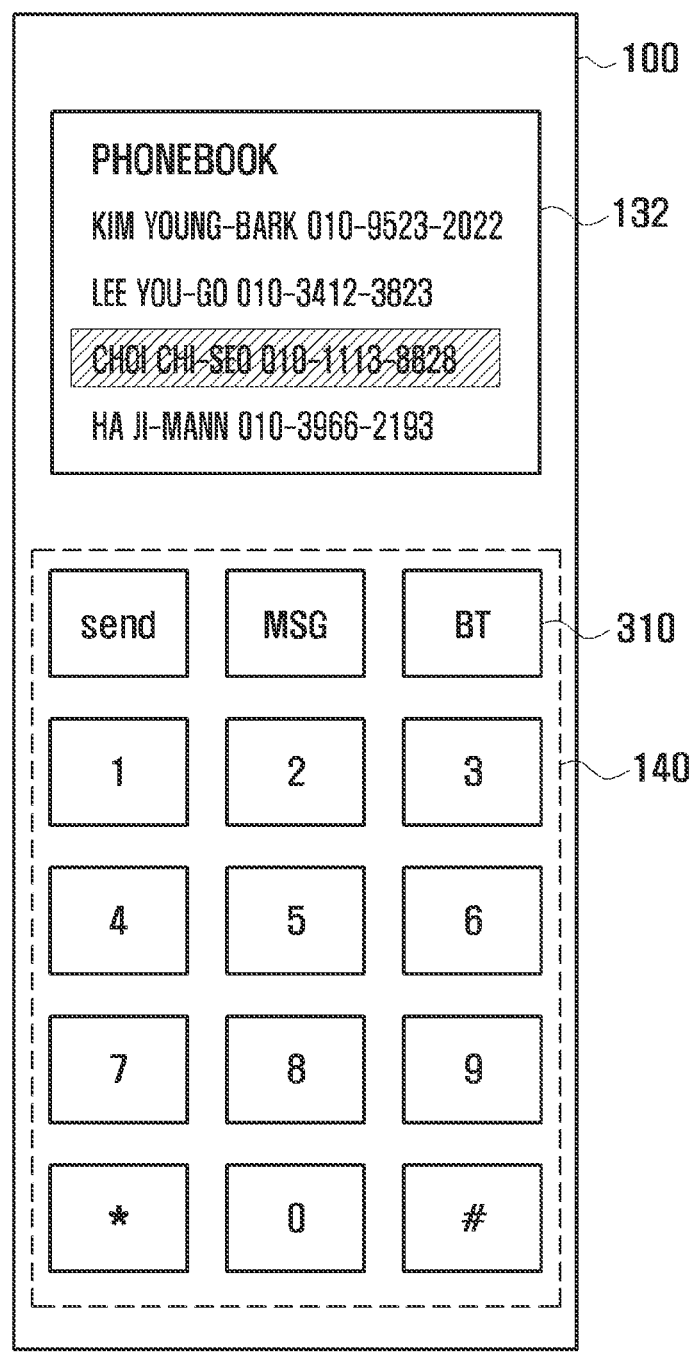

FIGS. 3A and 3B are diagrams illustrating exemplary states of the short range wireless communication apparatus with the inputs of contact information and call request command according to an exemplary embodiment of the present invention. The description is directed to the short range wireless communication apparatus supporting Bluetooth communication function. However, exemplary embodiments of the present invention can be applied to other types of short range wireless communication devices.

Referring to FIG. 3A, the user can input the phone number manually by means of the input unit 140 implemented with a key input module or a touch sensor. The phone number input by the user is processed as an input of contact information. If the user pushes the Bluetooth button 310 while the phone number is entered, the short range communication unit 110 places a call to the Bluetooth device represented by the phone number (010-1113-8828).

Referring to FIG. 3B, the user can input the contact information by selecting one of contact items from the phonebook. If the Bluetooth button is pushed while the contact item of Choi Chi-Seo (010-111308828) is selected from the phonebook, the short range communication unit 110 attempts to establish a connection to the Bluetooth device represented by the contact item of 'Choi Chi-Seo 010-1113-8828'.

Returning to FIG. 2, upon receipt of the call request command, the control unit 160 determines whether the short range wireless communication device connection information corresponding to the contact information input by the user is stored in the storage unit 150 in step 230. If the short range wireless communication device connection information corresponding to the contact information exists in the storage unit 150, the control unit 160 establishes a connection to the device according to the short range wireless communication device connection information retrieved from the storage unit 150 in step 240. If no short range wireless communication device connection information corresponding to the contact information, the control unit 160 collects the device information of the short range wireless communication devices discovered nearby in step 250.

The short range wireless communication device connection information is the device information of the short range wireless communication device to which a call is made automatically by referencing the corresponding contact information. Each contact item of the phonebook may include the information shown in table 1:

TABLE 1

| Name | Choi Chi-Seo |
|---|---|
| Phone number | 010-1113-8828 |
| Address | ... |
| ... | |
| Short range wireless communication device connection information (Bluetooth address) | 3924-CD32-FAD3 |

The phonebook includes the Bluetooth address of 3924-CD32-FAD3 corresponding to the contact item of 'Choi Chi-Seo/010-1113-8828'. If the user pushes the Bluetooth button after inputting the phone number '010-1113-8828' manually or selecting the contact item 'Choi Chi-Seo/010-1113-8828' from the phonebook, the short range communication unit 110 establishes a connection to the Bluetooth device having the Bluetooth address '3924-CD32-FAD3' corresponding to the contact information. If the connection establishment has failed in step 240, the control unit 160 may output an alarm message notifying of the connection failure. When the connection has been established successfully in step 240, the control unit 160 can execute a function of the short range wireless communication apparatus 100 with the connection.

Table 2 shows the information elements of each contact item according to an exemplary embodiment of the present invention.

TABLE 2

| Name | Choi Chi-Seo |
|---|---|
| Phone number | 010-1113-8828 |
| Address | ... |
| ... | |
| Short range wireless communication device connection information (Bluetooth address) | Null |

In the exemplary case of table 2, the contact item has no short range wireless communication device connection information corresponding to the contact information. In this case, the control unit 160 collects the device information of the short range wireless communication devices discovered nearby in step 250. For example, the device information collector 161 can collect the device information, i.e. Bluetooth names and Bluetooth addresses, of Bluetooth devices discovered nearby.

In step 260, the short range communication unit 110 establishes a connection to the short range wireless communication device represented by the device information corresponding to the contact information input in step 210.

Figure 4:
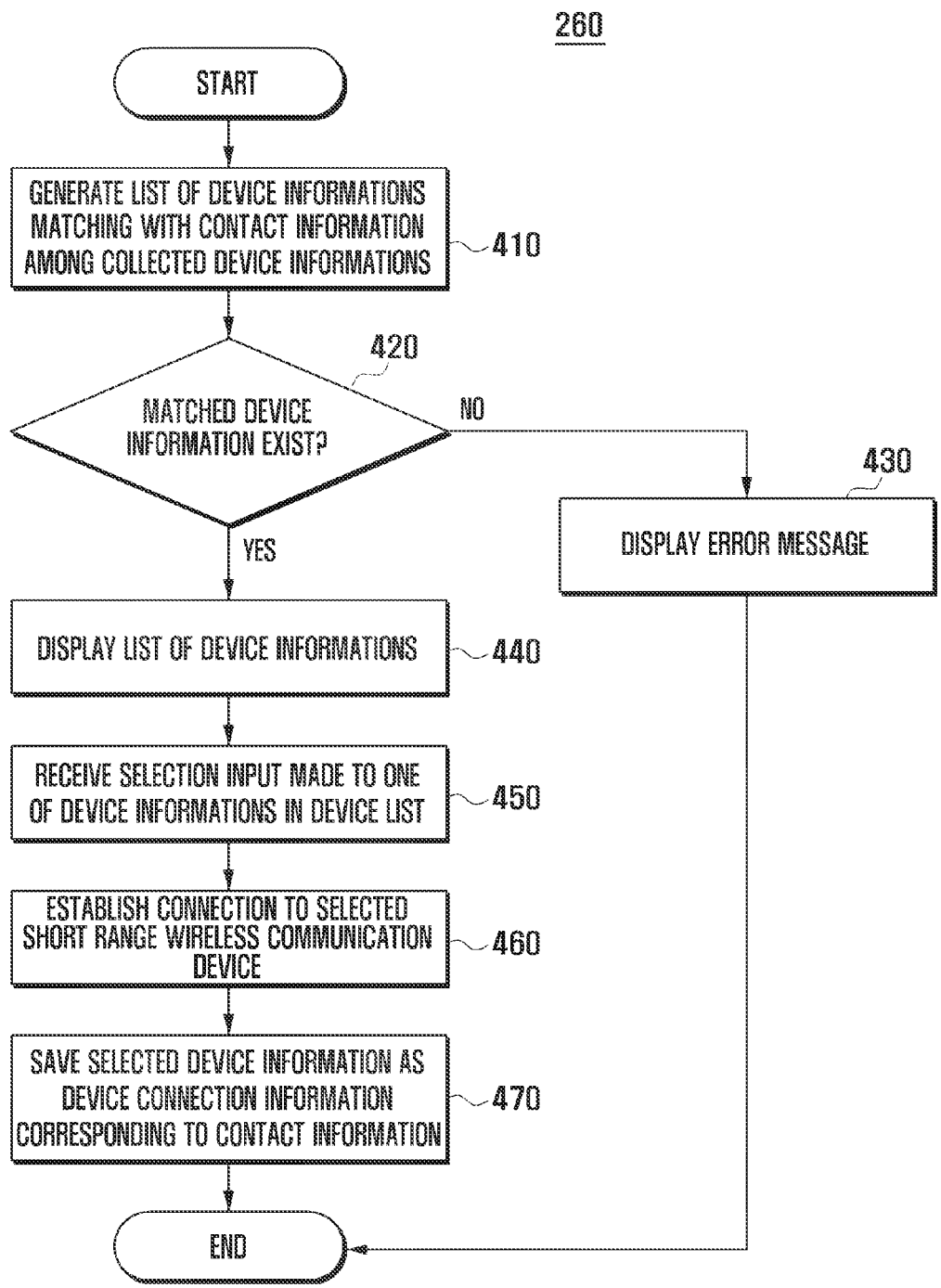
FIG. 4 is a flowchart illustrating steps of the connection establishment procedure of FIG. 2 according to an exemplary embodiment of the present invention.

FIG. 4 is a flowchart illustrating steps of the connection establishment procedure 260 of FIG. 2 according to an exemplary embodiment of the present invention.

Referring to FIG. 4, in step 410, the list generator 162 generates a device list of device information corresponding to the contact information input in step 210. Here, it is assumed that the contact information 'Choi Chi-Seo' is input in step 210. The list generator 162 compares at least one of the contact name and phone number with the collected device information to determine whether there is any match.

Table 3 shows an exemplary device list created based on the device information collected in step 250. Here, it is assumed that the device information collector collects the device information of Bluetooth devices discovered nearby.

TABLE 3

| Bluetooth name | Bluetooth address |
|---|---|
| CS-2930(88**) | 3403-CACE-32F3 |
| ipeblue | 3202-AE39-11A2 |
| HJC-39(88**) | 3849-EED0-AD12 |
| KE-3291(88**) | 3402-EFAE-98A0 |

In case of the Bluetooth module incorporated in a mobile terminal, the Bluetooth name is generally followed by (XX). XX is the first two digits of the last 4 digits of a phone number of the mobile terminal. For example, if the phone number of a mobile terminal is 010-1283-4638, the Bluetooth name of the Bluetooth module incorporated in the mobile terminal is given as 'model (46). Accordingly, the list generator 162 extracts the first two digits '88' of the last 4-digit section '8828' of the phone number in the contact information 'Choi Chi-Seo' and uses these 2 digits as a reference for comparison. The first two digits of the 5-digit character string of the Bluetooth name of the discovered Bluetooth device are used as the target of the comparison. For example, the comparison target part of each of the Bluetooth names CS-2930(88) and KE-3291(88) is '88' which is identical with the comparison part '88'. Accordingly, the list generator 162 determines that the Bluetooth names CS-2930(88) and KE-3291(88) are identical with the corresponding contact information.

The description has been directed to the case where the phone number of the contact information is compared with Bluetooth name herein. However, the contact name (person's name), rather than the phone number, may also be used as the reference for comparison. When using other types of short range wireless communication module, the device information can be the information provided in compliance with the corresponding short range wireless communication protocol.

In the above description, a predetermined part of a phone number has been compared with a predetermined part of the Bluetooth name. However, the comparison target part may also be determined through pattern recognition. For example, when the Bluetooth name has a part bracketed with parentheses, the bracketed part can be used as the comparison target. Similarly, when the phone number or contact name is identical with the Bluetooth name in a predetermined length, it is determined that the contact information and the Bluetooth device information are matched with each other. In this manner, whether the device information matches with the contact information can be determined using different method according to the character string processing way.

After generating the device list, the list generator 162 determines whether any device information matches the contact information input in step 210 in the device list in step 420. If there is no matching device information, the control unit 160 controls such that an error message is displayed by means of the display unit 132 in step 430. The error message may include an exemplary content of 'there is no Bluetooth device matched with the corresponding contact information.' According to an exemplary embodiment of the present invention, where there is no device information (collected in step 250) matched with the contact information input in step 210, the control unit 160 may display a device list having all of the devices discovered in step 250.

If there is matching device information (collected in step 205), the display unit 132 displays the list of the devices of which device information matches with the contact information in step 440.

Figure 5A:
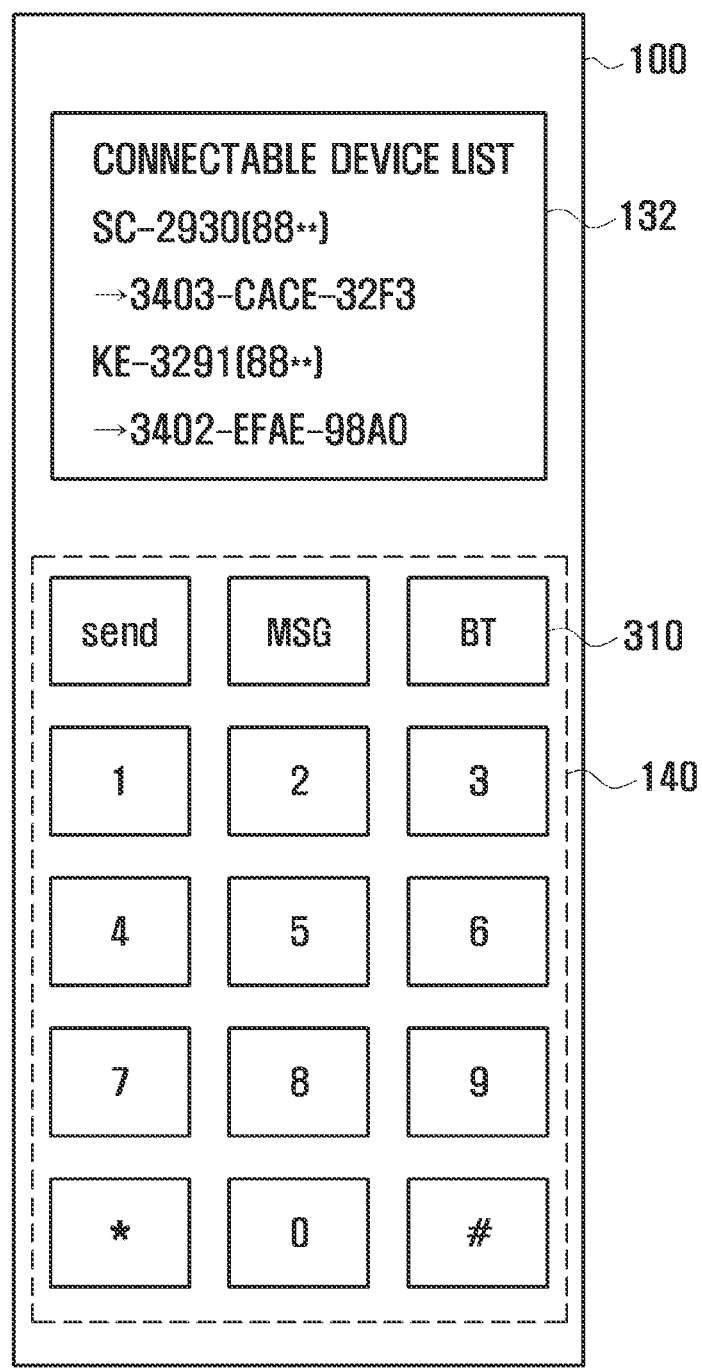
FIGS. 5A and 5B are diagrams illustrating exemplary states of the short range wireless communication apparatus presenting a connection-available device list and popup message respectively according to an exemplary embodiment of the present invention.
Figure 5B:
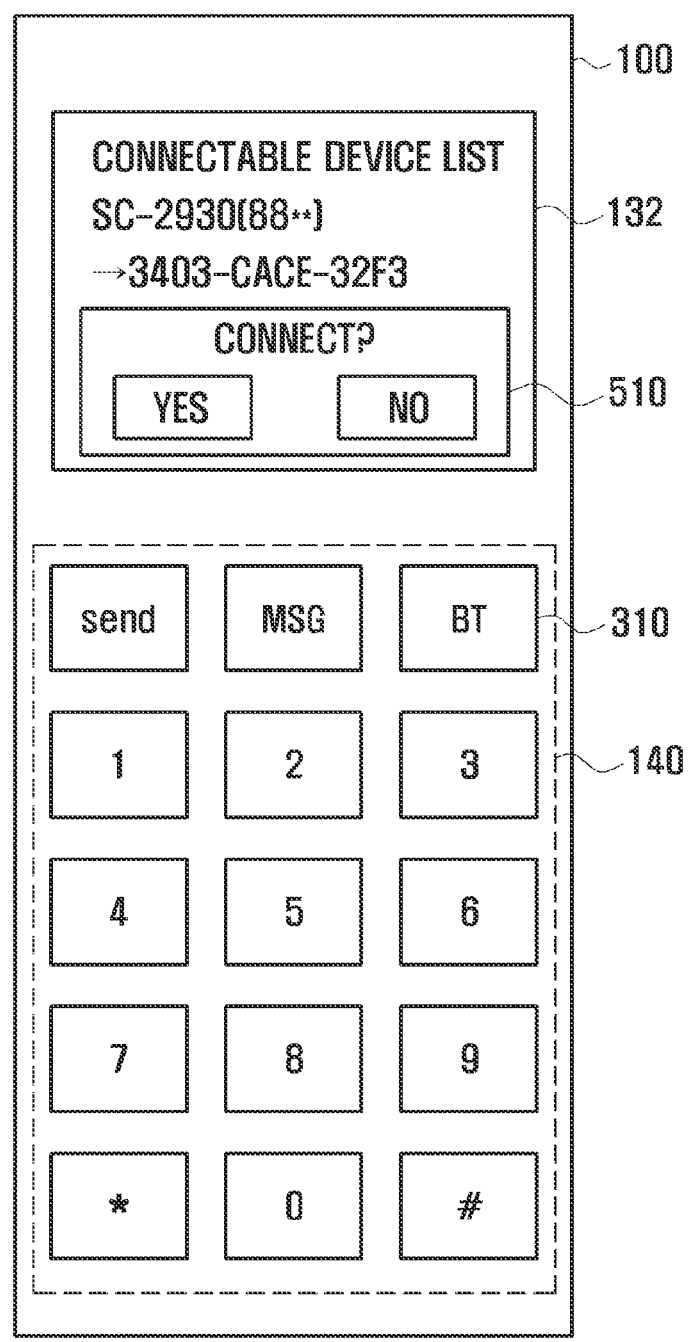

FIGS. 5A and 5B are diagrams illustrating exemplary states of the short range wireless communication apparatus presenting a connection-available device list and popup message respectively according to an exemplary embodiment of the present invention.

Referring to FIG. 5A, the device list includes device information of two discovered devices that match with the contact information. Table 4 shows an exemplary device list having the device information.

TABLE 4

| Bluetooth name | Bluetooth address |
|---|---|
| SC-2930(88**) | 3403-CACE-32F3 |
| KE-3291(88**) | 3402-EFAE-98A0 |

The device list having the device information corresponding to the contact information is displayed by the display unit 132.

Referring to FIG. 5B, the device list includes the device information matching with the contact information when only one device is discovered. The display unit 132 displays the device information, i.e., the Bluetooth name of SC-2903 (88) and the Bluetooth address of 3403-CACE-43F3. When only one device of which device information matches with the contact information is discovered, the control unit 160 establishes a connection to the Bluetooth device represented by the device information without addition input or presents a popup window 510 prompting the user for confirming the connection to the Bluetooth device as shown in FIG. 5B**.

While the device list is displayed, the input unit 140 receives a selection input made by the user for selecting one of the device information items from the device list in step 450. The user can select the short range wireless communication device by making a touch input or key input to the device information item in the device list. The input unit 140 also receives the input made by the user on the popup window 510 to confirm or cancel the connection to the device as shown in FIG. 5B.

The short range communication unit 110 establishes a connection to the selected short range wireless communication device in step 460.

The storage unit 150 stores the device information selected in step 450 as the short range wireless communication device connection information corresponding to the contact information input in step 210 in step 470. As described with reference to table 1, each contact item of the phonebook can further include the short range wireless communication device connection information (Bluetooth address) in addition to the name field and the phone number field. Unlike the case of table 1, the phone number, other contact information, and short range wireless communication device connection information corresponding to the contact information can be stored as along with their mapping in a separate table rather than the form of table 1. The short range wireless communication device connection information stored in the aforementioned manner can be used afterward in step 230 of FIG. 2. When the connection request command input is made to the contact information, the short range wireless communication apparatus 100 can establish the connection to the short range wireless communication device without collecting the device information of the short range wireless communication devices discovered nearby.

Figure 6:
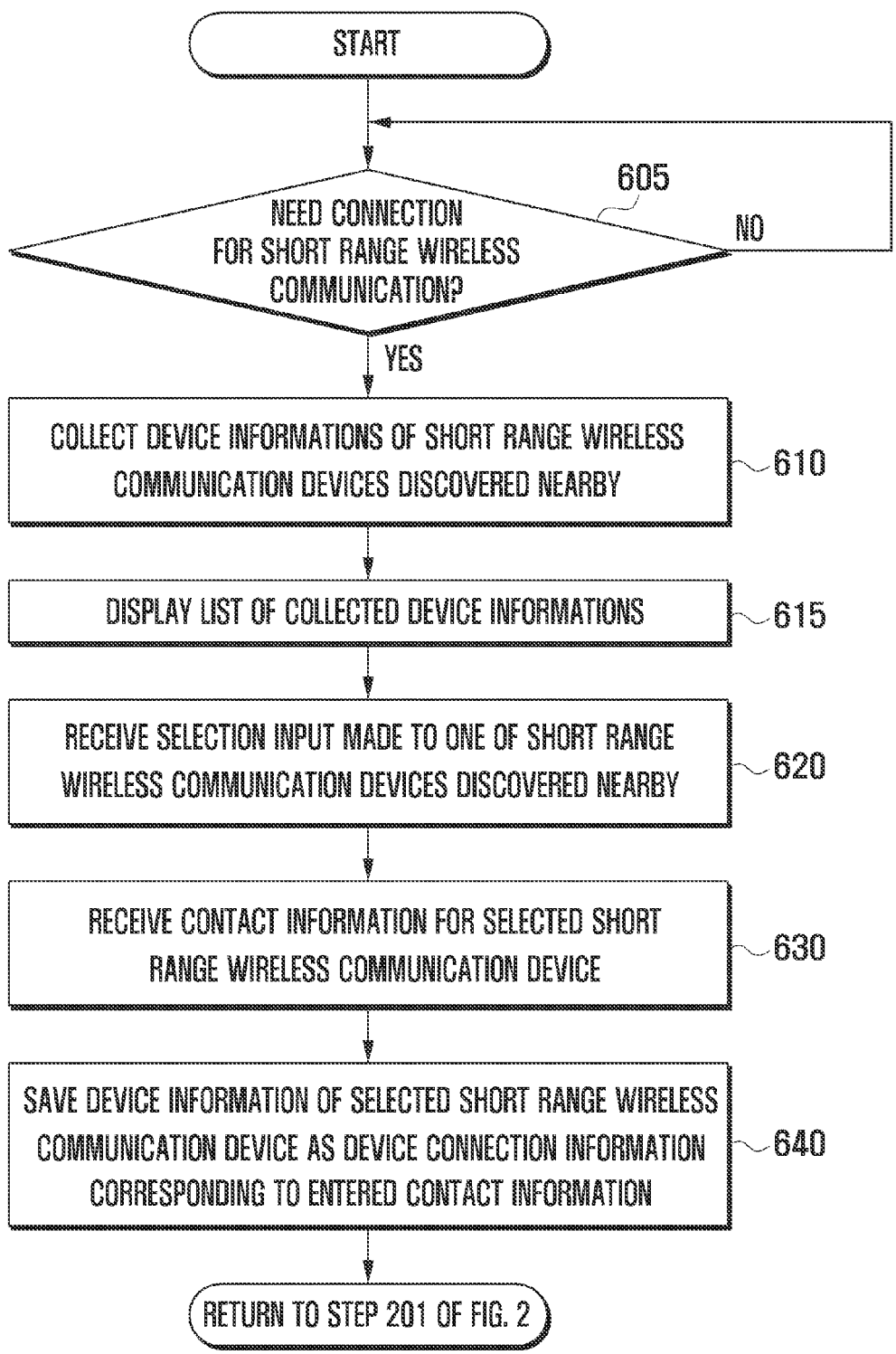
FIG. 6 is a flowchart illustrating a procedure for acquiring the short range wireless communication device connection information in the channel establishment method according to an exemplary embodiment of the present invention.

FIG. 6 is a flowchart illustrating a procedure for acquiring the short range wireless communication device connection information in the channel establishment method according to an exemplary embodiment of the present invention.

Referring to FIG. 6 shows the procedure for storing the connection information of a short range wireless communication device having no contact information such as Bluetooth headphone.

The control unit 160 determines whether it is necessary to establish a connection for short range wireless communication in step 605. For example, if a Bluetooth device connection request is made by the user, the control unit 160 can determine that it is necessary to establish a connection for short range wireless communication. In case that a connection for the short range wireless communication is necessary, the procedure goes to step 610 and, otherwise, waits until it becomes necessary to establish a connection for short range wireless communication.

In step 610, the device information collector 161 collects the device information of the short range wireless communication devices discovered nearby. For example, when a Bluetooth device discovery request is input by the user, the device information collector 161 discovers the Bluetooth devices and collects the device information of the discovered Bluetooth devices. The display unit 132 displays a list of the device information collected in association with the discovered devices in step 615. In case that the discovered short range wireless communication devices have no contact information, the corresponding device information items can be displayed on the screen in the form of an entire device list without comparison with any contact information. In the state where the device list is displayed, the input unit 140 receives a selection input made by the user for selecting one of the device information items from the list in step 620.

Figure 7:
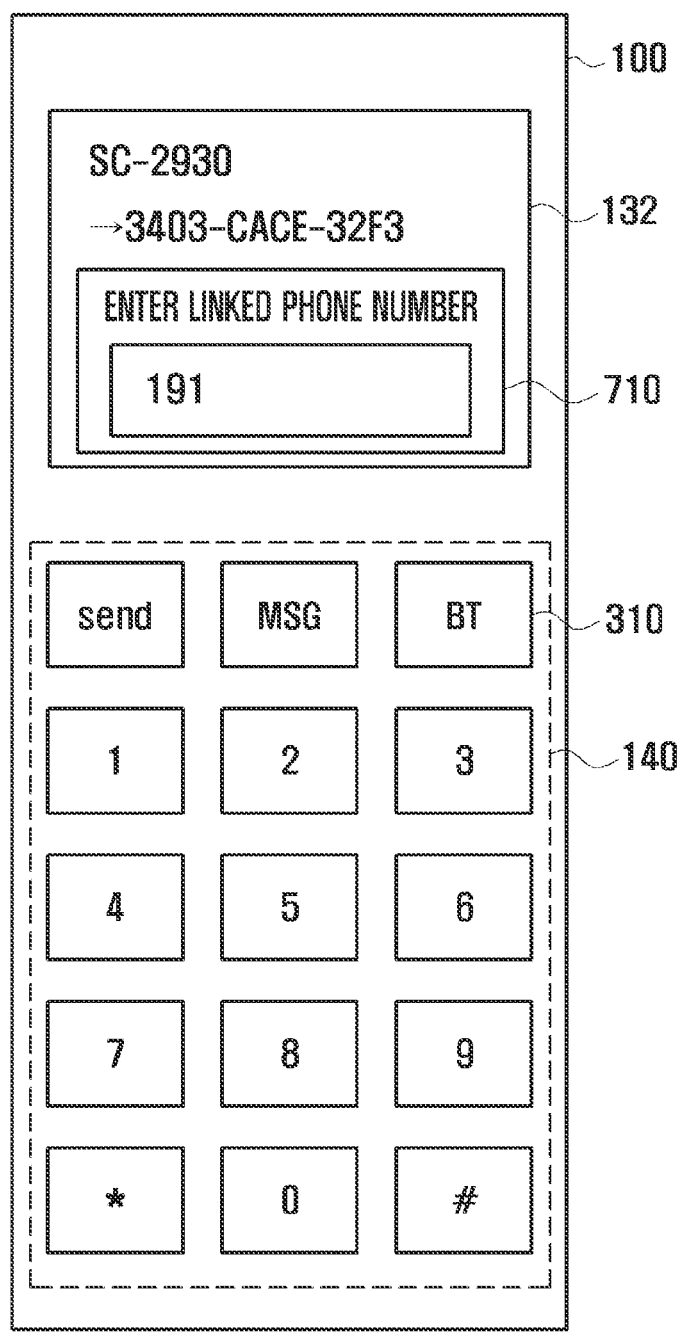
FIG. 7 is a diagram illustrating an exemplary state of the short range wireless communication apparatus presenting a contact information input screen according to an exemplary embodiment of the present invention.

FIG. 7 is a diagram illustrating an exemplary state of the short range wireless communication apparatus presenting a contact information input screen according to an exemplary embodiment of the present invention.

Referring to FIGS. 6 and 7, the input unit 140 receives the contact information input made to the selected short range wireless communication apparatus in step 630. If one of the devices represented by the device information items is selected from the list via the input unit 140, the display unit 132 may present an interface for the user to enter the contact information, e.g. linked phone number. For example, the user can enter a linked phone number in the input box 710 as shown in FIG. 7.

If the user enters a linked phone number in the input box 710, the storage unit 150 stores the device information of the selected short range wireless communication device as the short range wireless communication device connection information corresponding to the entered contact information in step 640. The control unit 160 links the Bluetooth address of the short range wireless communication device selected in step 620 to the phone number entered in the input box 710 and stores the linked information in the form of a phonebook item as shown in table 1 or in a general format.

If the user enters the linked phone number 191 in the input box 710 and pushes the Bluetooth connection button 310 in step 220, the short range communication unit 110 attempts to establish a connection to the Bluetooth address corresponding to the linked phone number 191, i.e., the Bluetooth address selected in step 620. The user may assign a certain phone number to a certain Bluetooth device so as to establish a connection to the Bluetooth device in a simple way afterward using the Bluetooth button. Although the description has been directed to the connection establishment procedure based on the Bluetooth protocol, it is obvious to those skilled in the art that the present invention can be applied to a connection establishment procedure based on other types of short range wireless communication protocols.

As described above, the short range wireless communication apparatus and method for establishing a connection to a short range wireless communication device according to the present invention is advantageous for the user to use the short range wireless communication function.

It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, implement the functions/acts specified in the flowchart and/or block diagram block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Furthermore, the respective block diagrams may illustrate parts of modules, segments, or codes including at least one or more executable instructions for performing specific logic function(s). Moreover, it should be noted that the functions of the blocks may be performed in different order in several modifications. For example, two successive blocks may be performed substantially at the same time, or may be performed in reverse order according to their functions.

The term "module" according to the embodiments of the invention, means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more CPUs in a device or a secure multimedia card.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for establishing a connection to a bluetooth device, comprising:
   receiving a connection request to a device corresponding to contact information stored in the bluetooth device that is inputted to the bluetooth device by a user selecting the contact information;
   collecting, when no device information of bluetooth devices corresponds to the selected contact information, the device information of bluetooth devices discovered within a bluetooth communication range of the bluetooth device; and
   when a user touches a bluetooth button on a screen, establishing a connection to the bluetooth device having the device information matching with the selected contact information in part from among the collected device information,
   wherein the contact information is at least one of a contact name and a phone number.

2. The method of claim 1, wherein the establishing of the connection to the bluetooth device comprises:
   generating a device list including bluetooth devices of which device information match with the selected contact information in part;
   displaying the device list;
   receiving a selection input made to one of the device information in the device list; and
   establishing the connection to a bluetooth device corresponding to the device information selected by the selection input.

3. The method of claim 2, further comprising storing, after receiving a selection input, the device information selected by the selection input as a bluetooth device connection information corresponding to the selected contact information.

4. The method of claim 3, wherein the collecting of the device information comprises:
   receiving contact information;
   receiving a connection request made to the contact information;
   establishing, when the bluetooth device connection information corresponding to the contact information is stored, a connection to the bluetooth device corresponding to the bluetooth device connection information; and
   collecting, when no bluetooth device connection information is stored, the device information of the bluetooth devices discovered within the bluetooth communication range.

5. The method of claim 2, wherein the generating of the device list comprises extracting the device information having a device name matching with a phone number of the selected contact information in part.

6. The method of claim 2, wherein the generating of the device list comprises extracting the device information having a device name matching with a contact name of the selected contact information in part.

7. The method of claim 2, wherein the generating of the device list comprises extracting the device information having a device name matching with a phone number of the selected contact information in part.

8. A bluetooth communication apparatus comprising:
   an input unit configured to receive contact information and a connection request to a device corresponding to the contact information, the connection request being inputted to the input unit by a user selecting the contact information;
   a device information collector configured to collect, when no device information of bluetooth devices corresponds to the selected contact information, device information of bluetooth device discovered within a bluetooth communication range of the bluetooth device; and
   a bluetooth communication unit configured to establish a connection to the bluetooth communication having the device information matching with the selected contact information in part among the collected device information when a user touches a bluetooth button on a screen,
   wherein the contact information is at least one of a contact name and a phone number.

9. The bluetooth communication apparatus of claim 8, further comprising:
   a list generator configured to generate a device list including bluetooth devices of which device information match with the selected contact information in part;
   a display unit configured to display the device list; and
   an input unit configured to receive the connection request made to the contact information and a selection input made to one of the device information in the device list,
   wherein the bluetooth communication unit establishes the connection to a bluetooth device corresponding to the device information selected by the selection input when a user touches a bluetooth button on the display unit.

10. The bluetooth communication apparatus of claim 9, further comprising a storage unit configured to store the device information selected by the selection input as a bluetooth device connection information corresponding to the contact information.

11. The bluetooth communication apparatus of claim 10, wherein the device information collector is further configured to establish, when the bluetooth device connection information corresponding to the contact information is stored, a connection to the bluetooth device corresponding to the bluetooth device connection information, and to collect, when no bluetooth device connection information is stored, the device information of the bluetooth devices discovered within the bluetooth communication range.

12. The bluetooth communication apparatus of claim 9, wherein the list generator is further configured to extract the device information having a device name matching with a phone number of the selected contact information in part.

13. The bluetooth communication apparatus of claim 9, wherein the list generator is further configured to extract the device information having a device name matching with a contact name of the selected contact information in part.

14. The bluetooth communication apparatus of claim 9, wherein the list generator extracts the device information having a device name matching with a phone number of the selected contact information in part.

* * * * *